Figure 1:
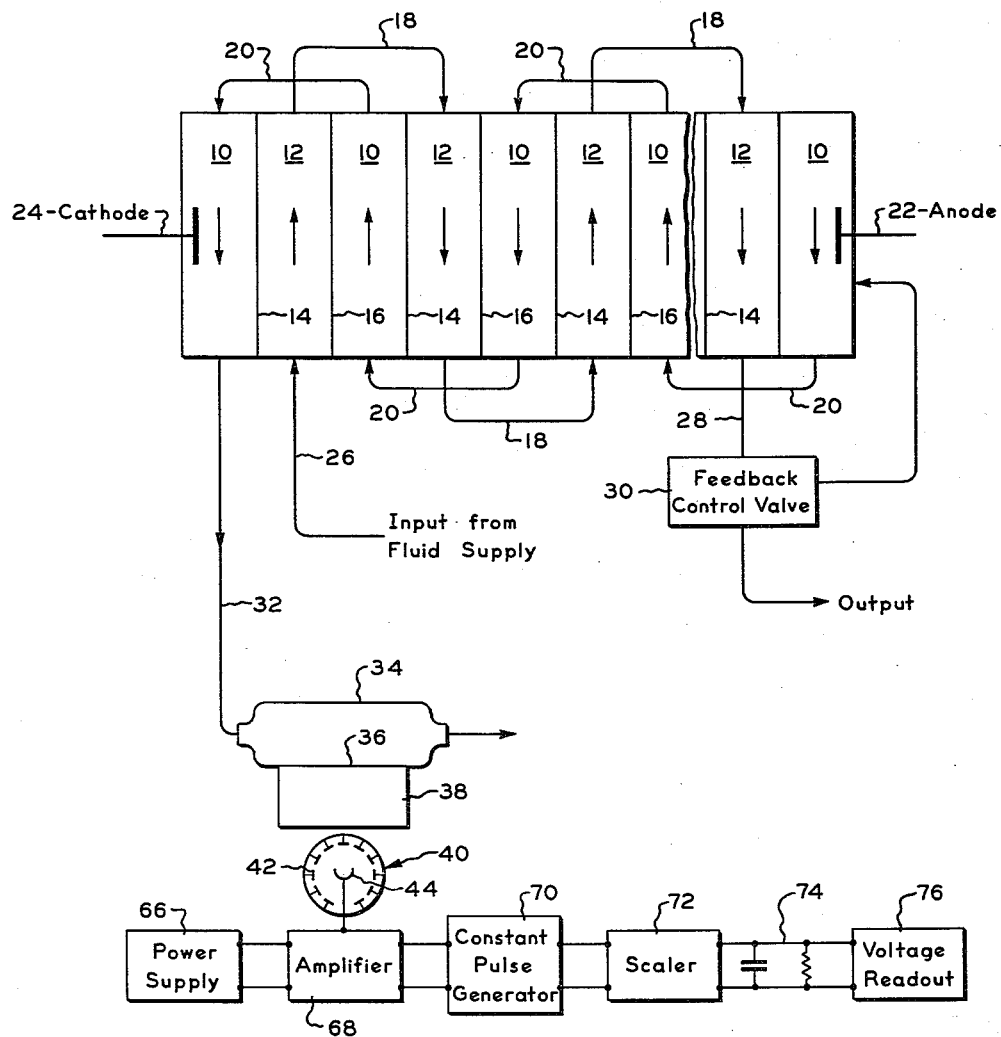

Jan. 14, 1964     D. R. DEWEY II     3,117,842
SYSTEM FOR CONTINUOUSLY MONITORING THE RADIOACTIVITY OF FLUIDS
Filed Feb. 23, 1960     2 Sheets-Sheet 1

INVENTOR
Davis R. Dewey
BY Morse & Altman
ATTORNEYS

United States Patent Office 3,117,842
Patented Jan. 14, 1964

3,117,842
SYSTEM FOR CONTINUOUSLY MONITORING THE RADIOACTIVITY OF FLUIDS
Davis R. Dewey II, 1 Old Winter Road, Lincoln, Mass.
Filed Feb. 23, 1960, Ser. No. 10,331
3 Claims. (Cl. 23—253)

The present invention relates to the detection of radioactivity and, more particularly, to a system for continuously monitoring the concentration of radioactive materials in a fluid.

Ordinarily, the concentration of radioactive materials, for example, in public water supplies and the like is so low as to render detection relatively difficult and time consuming. Thus, one time consuming monitoring procedure involves obtaining large samples of water for evaporation at intervals in order to concentrate any radioactive material for convenient detection. The present invention contemplates continuous monitoring of radioactivity in a fluid by an integrated system that operates in a simple manner to increase the concentration of the radioactive materials and to subject the radioactive materials so concentrated to a detecting device that provides continuous indication.

Generally, the system of the present invention provides a path that is defined between an electropositive surface and an electronegative surface, between which the fluid flows and by which the radioactive material is concentrated for detection. One such system utilizes electrolytic dissociation. It is known that when a quantity of water, containing an electrolyte such as an ionizable salt, acid or base, is disposed between a barrier composed of a cation exchange material and a barrier composed of an anion exchange material under an electric field, electrolytic migration of the dissolved ions occurs. Cations migrate through the cation exchange barrier and anions migrate through the anions exchange barrier so that the water between these barriers is purified and electrolyte on opposite sides of these barriers is concentrated. The region between the barriers may be appropriately called a diluting cell and the regions on opposite sides thereof may be appropriately called concentrating cells. It is apparent that radioactive materials are more readily and rapidly detected by radioactivity counters when concentrated than when diluted. In accordance with the present invention, relatively major continuous flow of the fluid being monitored takes place through the diluting cell and relatively minor continuous flow takes place through the concentrating cells. In consequence, certain radioactive materials, ordinarily ionic, tend to migrate into the concentrating cells for detection and certain radioactive materials, ordinarily non-ionic tend to accumulate on the surfaces of the exchange barriers for detection. The flow through the diluting cell takes place directly from the fluid supply and may be returned directly thereto. The fluid in the concentrating cells is provided either by diffusion from the diluting cells through the exchange barriers or directly from an outside supply, from the water of the demineralizing cells being returned to the water supply, etc.

Accordingly, objects of the present invention are to provide in a system for monitoring the radioactivity of a fluid: electropositive means and electronegative means defining therebetween a path, means for directing a fluid through the path in order to concentrate charged material contained in the fluid, and detecting means for measuring the radioactivity of the charged material; and to provide diluting and concentrating cell means separated from each other by anion and cation exchange barrier means, the diluting cell means being arranged to transfer a relatively large volume of fluid, the concentrating cell means being arranged to transfer a relatively small volume of fluid, and detecting means for determining the intensity of radioactivity of material concentrated by the system.

Other objects of the present invention will in part be obvious and will in part appear hereinafter.

The invention accordingly comprises the system possessing the features, properties and relation of elements which are exemplified in the following detailed disclosure, and the scope of which will be indicated in the claims.

For a fuller understanding of the nature and objects of the present invention, reference should be had to the following detailed description taken in connection with the accompanying drawing wherein:

FIGURE 1 discloses an apparatus embodying the present invention; and

Figure 2:
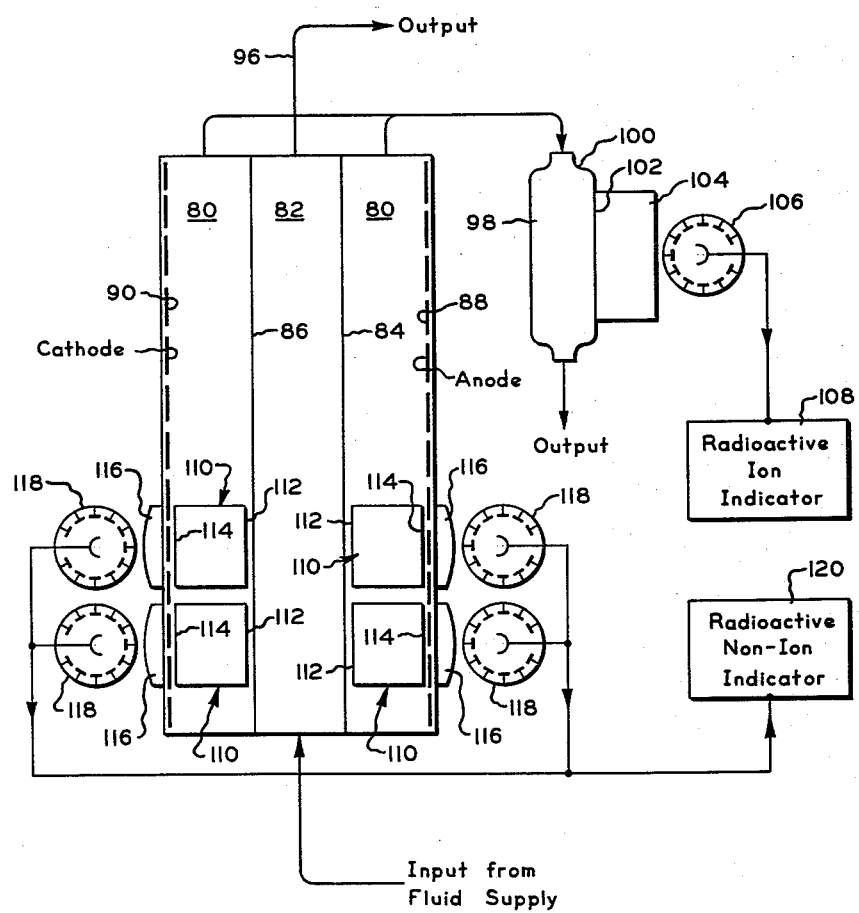

FIGURE 2 discloses an alternative apparatus embodying the present invention.

The exemplary system illustrated in FIG. 1, comprises an alternating sequence of concentrating cells 10 and diluting cells 12, which are bounded by interspersed anion exchange barriers 14 and cation exchange barriers 16. Diluting cells 12 communicate with each other in sequence through conduits 18 and concentrating cells 10 communicate with each other in sequence through conduits 20. A suitable electric field is applied across the cells between an anode 22 and a cathode 24. Water to be continuously sampled from a water supply is fed into the first of diluting cells 12 through an input conduit 26, thence through the remaining diluting cells 12 via conduits 18 and is returned to the water supply through an output conduit 28. Water is supplied to concentrating cells 10, either as a small proportion of the output of the diluting cells through a feed-back control valve 30 or through the exchange barriers themselves directly from the diluting cells. The flow of water containing increasingly concentrated electrolyte takes place from the first concentrating cell 10, through the remaining concentrating cells via conduits 20 and therefrom through an output conduit 32 to a detecting chamber 34.

Exchange materials are characterized by high specific electrical conductivities. The cation exchange material may be characterized as a region in which there is present a substantial number of negatively charged functional groups attached to a large molecular structure. The screening effect of this fixed negative charge is to repel anions of the dissociated electrolyte to a considerable extent and to cause cations to move into or across this fixed negative charge to a greater extent. Similarly the barrier of anion exchange material may be characterized as a region of positive fixed charge which serves to repel cations to a considerable extent and to cause anions to move into or across this fixed positive charge to a greater extent.

The barriers used in this invention are described in greater detail in U.S. Patent No. 2,636,851, issued on April 28, 1953, in the names of Walter Juda and Wayne A. McRae for "Ion-Exchange Materials and Method of Making and Using the Same." In general, these are solid unfractured structures that comprise, as an essential component, a predominant amount of an ion exchange resin including a synthetic organic polymeric matrix, dissociable ionic groups chemically bonded to the polymeric matrix and water in gel relationship with the matrix. The dissociable groups should have a dissociation constant of at least $10^{-5}$ and should be present in an amount of at least 3.0 milliequivalents per gram of dry resin for groups having a dissociation constant of between $10^{-5}$ and $10^{-3}$ and in an amount of at least 0.3 milliequivalent per gram of dry resin when the dissociation constant is $10^{-5}$ or greater. In the anion permeable barrier, the groups are dissociable into anions that are mobile and cations that are bonded to the polymeric matrix to impart a fixed charge thereto; conversely, in the cation permeable barrier, the groups are dissociable into cations that are mobile and anions that are bonded to the polymeric matrix to impart a fixed charge thereto. The water in gel relationship with the polymeric matrix should be present in an amount of at least 15% of the weight of the dry resin, and higher amounts, in excess of 25% of the weight of dry resin are preferred. In the preparation of such ion exchange barriers, appropriate polymerizable organic compounds are dissolved in water, polymerized and cured to water insolubility. The final stage is effected without evaporation so that the resulting polymer may be cured to an integrated gel formation.

The output of concentrated electrolyte through detecting chamber 54 is continuously monitored in the following manner. Region 34 is defined by a tube, one wall 36 of which may constitute a window for a scintillation medium 37. This window is either mica or aluminum and has a low enough mass per unit area to avoid undue absorption of energy emitted by the water passing through region 34. Adapted to receive energy through window 36 is a fluorescent block 38 that is composed, for example, of thallium activated sodium iodide. In conventional fashion, fluorescent block 38 is associated with a photomultiplier tube 40, including a plurality of dynodes 42 and an anode 44, which is operatively connected to a sutiable electrical measuring system including a power supply 66, an amplifier 68, a pulse generator 70, a scaler 72, a filter 74 and a voltmeter readout 76.

In operation, water flows in large volume from the supply through input conduit 26 to the monitor in sequence through diluting cells 12 via conduits 18, output conduit 28 and feedback control 30 back to the water supply. At the same time water flows in small volume through concentrating cells 10 via conduits 20 and through output conduit 32 to detecing chamber 34. The water in concentrating cells 10 is replenished either by feedback of a small portion of the output of demineralizing cells 12 through control valve 30, by diffusion through exchange barriers 14 and 16 or by addition from an outside source. The arrangement is such that concentration of radioactive materials fed through output conduit 28 is at least three times the concentration of radioactive materials fed into diluting cells 12. The flow through detecting chamber 34 is monitored continuously by photomultiplier tube 40, the output of which is converted to a continuous visible indication by the system comprising power supply 66, amplifier 68, pulse generator 70, scaler 72, filter 74 and voltage readout 76.

The exemplary system illustrated in FIG. 2 comprises a sequence of concentrating and diluting cells 80 and 82, which are separated by interspersed anion exchange and cation exchange barriers 84 and 86. A suitable electric field is applied across the cells between an anode 88 and a cathode 90, each of which is in the form of a fine wire grid. Water to be continuously sampled is fed into diluting cell 82 through an input conduit 94 and out of dilutingcell 82 through an output conduit 96. Water is supplied to concentrating cells 80, either as a small proportion of the output of the diluting cell or through the exchange barriers themselves directly from the diluting cells.

In consequence, dispersed material such as radioactive electrolytes tend to concentrate in cells 80, 80 and material such as radio active colloids, which cannot pass through exchange barriers 84 and 86, tend to collect on the surfaces of these exchange barriers.

The combined output of concentrated electrolyte from concentrating cells 80, 80 is directed through a detecting chamber 98 and is continuously monitored in the following manner. Chamber 98 is defined by a tube 100 of which one wall 102 may constitute a window for a scintillation medium 104. This window is either mica or aluminum and has a low enough mass per unit area to avoid undue absorption of energy emitted by water passing through region 98. Adapted to receive energy through window 102 is a fluorescent block 104 that is composed, for example, of thallium activated sodium iodide. In conventional fashion, fluorescent block 104 is associated with a photomultiplier tube 106 and a counting system 108. The accumulated radioactive material at the inner faces of exchange barriers 84 and 86 is continuously monitored in the following manner. Slightly spaced from the outer faces of exchange barriers 84 and 86 are a plurality of scintillation media 110. Each medium 110 is provided at its inner and transverse faces with an aluminum coat 112 that has a sufficiently low mass per unit area to avoid undue absorption of energy emitted through the exchange barriers and that reflects radiation generated within the medium. A glass coat 114 transmits such light from medium 110 through a condensing lens 116 to a photomultiplier tube 118. The photomultiplier tubes associated with all of media 110 are operatively connected to a counting system 120.

In operation, water flows in large volume through input conduit 94 through diluting cell 12 to output conduit 96. At the same time, water flows in small volume through concentrating cells 80, 80 and to detecting chamber 98. The water in concentrating cells 80, 80 is replenished either by feedback of a small proportion of the output of diluting cell 82, by diffusion through exchange barriers 84 and 86 or by addition from an outside source. The flow through detecting chamber 34 is monitored continuously by photomultiplier tube 40, the output of which is converted to a continuous visible indication by system 108. The accumulated radioactive material at the inner faces of exchange barriers 84 and 86 is monitored continuosly by photomultiplier tubes 118 the output of which are converted to a continuous visible indication by system 120. It will be understood that media 110 may be of different configurations in any or all of diluting cell 82 and concentrating cells 80, 80. Each medium 110 is slightly spaced from its adjacent exchange barrier to premit free flow in its vicinity and the mesh construction of the anode and cathode permit light from the media to be transmitted to the photomultiplier tubes.

Since certain changes may be made in the above devices without departing from the scope of the invention herein involved, it is intended that all matter contained in the above description or shown in the accompanying drawings shall be interpreted in an illustrative and not a limiting sense.

What is claimed is:

1. A system for monitoring radioactivity in fluids, said system comprising electropositive means and electronegative means defining therebetween a path, means for directing a fluid through said path in order to cause concentration of ionic radioactive material contained in said fluid, said concentration being initially at opposite edges of said path, and detecting means for measuring the radioactivity of said ionic radioactive material, said detecting means being positioned in contiguity with said concentration, said detecting means is adjacent to at least one of said electropositive means and said electronegative means in order to detect radiation from material deposited thereon.

2. A monitoring system for a water supply containing charged radioactive material, said system comprising a plurality of demineralizing cells and concentrating cells, said demineralizing cells being separated from said concentrating cells by anion and cation exchange barriers, means for applying electric potential across said cells, means for flowing said water at a relatively major rate from said supply continuously through said demineralizing cells in series back to said supply, means for flowing a proportion of said water at a relatively minor rate continuously through said concentrating cells in series and through a detecting chamber, a first radiation detector operatively connected to said detecting chamber, a counting system operatively connected to said first radiation detector for providing a continuous indication of the radioactivity of supply, said anion and cation exchange barriers being solid unfractured structures characterized by an ion exchange resin including a synthetic polymeric matrix, dissociable ionic groups chemically bonded thereto and water in gel relation therewith, and a second radiation detector operatively associated and contiguous with at least one of said anion and cation exchange barriers.

3. A monitoring system for a water supply containing charged radioactive material, said system comprising a plurality of demineralizing cells and concentrating cells, said demineralizing cells being separated from said concentrating cells by anion and cation exchange barriers, means for applying electric potential across said cells, means for flowing said water at a relatively major rate from said supply continuously through said demineralizing cells in series back to said supply, means for flowing a proportion of said water at a relatively minor rate continuously through said concentrating cells in series and through a detecting chamber, a radiation detector operatively connected to said detecting chamber, a counting system operatively connected to said first radiation detector for providing a continuous indication of the radioactivity of supply, said anion and cation exchange barriers being solid unfractured structures characterized by an ion exchange resin including a synthetic polymeric matrix, dissociable ionic group chemically bonded thereto and water in gel relation therewith, and a radiation detector in contiguity with at least one of said exchange barriers.

References Cited in the file of this patent

UNITED STATES PATENTS

| | | |
|---|---|---|
| 2,860,095 | Katz | Nov. 11, 1958 |
| 2,854,394 | Kollsman | Sept. 30, 1958 |

OTHER REFERENCES

Samuelson: "Ion Exchangers in Anayltical Chem.," John Wiley and Sons, N.Y., 1953, p. 113 to 115. (Copy in Lib.)